United States Patent
Knestel et al.

(10) Patent No.: US 9,696,237 B2
(45) Date of Patent: Jul. 4, 2017

(54) WIND TUNNEL BALANCE

(71) Applicant: MAHA-AIP GMBH & CO. KG, Haldenwang (DE)

(72) Inventors: Anton Knestel, Hopferbach (DE); Christian Hartmann, Altusried (DE); Thomas Becherer, Dietmannsried (DE)

(73) Assignee: MAHA-AIP GMBH & CO. KG, Haldenwang (DE)

( * ) Notice: Subject to any disclaimer, the term of this patent is extended or adjusted under 35 U.S.C. 154(b) by 314 days.

(21) Appl. No.: 14/355,971

(22) PCT Filed: Oct. 31, 2012

(86) PCT No.: PCT/EP2012/071536
§ 371 (c)(1),
(2) Date: May 2, 2014

(87) PCT Pub. No.: WO2013/064525
PCT Pub. Date: May 10, 2013

(65) Prior Publication Data
US 2015/0000392 A1    Jan. 1, 2015

(30) Foreign Application Priority Data
Nov. 2, 2011 (DE) .................. 10 2011 085 640

(51) Int. Cl.
*G01M 9/04* (2006.01)
*G01M 9/02* (2006.01)
(Continued)

(52) U.S. Cl.
CPC .............. *G01M 9/04* (2013.01); *G01M 9/062* (2013.01); *G01M 17/007* (2013.01); *G01M 17/0074* (2013.01); *G01M 9/02* (2013.01)

(58) Field of Classification Search
CPC .. G01M 17/007; G01M 17/0074; G01M 9/04; G01M 9/062; G01M 17/0072;
(Continued)

(56) References Cited
U.S. PATENT DOCUMENTS 4,073,188 A * 2/1978 Slezinger ................ G01M 9/04
73/116.01
4,700,566 A * 10/1987 Hafner ...................... G01L 5/16
177/DIG. 9
(Continued)

FOREIGN PATENT DOCUMENTS

DE  10 2008 013 885 A1  9/2009
DE  10 2008 032 380 A1  1/2010
(Continued)

OTHER PUBLICATIONS

International Search Report issued in PCT/EP2012/071536 mailed Feb. 20, 2013.
(Continued)

*Primary Examiner* — John Fitzgerald
*Assistant Examiner* — Gedeon M Kidanu
(74) *Attorney, Agent, or Firm* — Oliff PLC

(57) ABSTRACT

The invention relates to a wind tunnel balance, having at least one belt unit that has at least one belt unit frame equipped with at least one conveyor belt that is wound around at least two rollers. The wind tunnel balance also has at least one fastening device that is suitable for fastening a vehicle to the conveyor belt in a predetermined position, a frame, and a platform that is supported so that it is able to move relative to the frame; force measuring elements are provided between the platform and the frame and are able to detect forces between the frame and platform, and the fastening device is attached to the platform in stationary
(Continued)

fashion. The invention permits a high-precision detection of aerodynamic forces in wind tunnel measurements or tests.

10 Claims, 4 Drawing Sheets

(51) Int. Cl.
  *G01M 9/06* (2006.01)
  *G01M 17/007* (2006.01)
(58) Field of Classification Search
  CPC .. G01M 17/022; G01M 17/06; G01M 17/045; G01M 17/065; G01M 7/022; G01M 9/06; G01L 5/282; G01L 5/0052; G01L 5/16; G01L 5/161; G01L 5/167; G01L 5/20
  USPC ........ 73/116.01, 116.07, 123, 147, 670, 856; 702/173, 175
  See application file for complete search history.

(56) References Cited

U.S. PATENT DOCUMENTS

| | | | | |
|---|---|---|---|---|
| 4,953,391 | A * | 9/1990 | Schober | G01M 17/045 73/116.07 |
| 5,111,685 | A * | 5/1992 | Langer | G01M 17/0074 73/118.01 |
| 5,337,600 | A * | 8/1994 | Kaneko | G01M 17/0072 73/116.07 |
| 6,427,528 | B1 * | 8/2002 | Yamakado | G01M 17/0072 73/121 |
| 7,614,291 | B2 | 11/2009 | Ebeling et al. | |
| 8,788,116 | B2 * | 7/2014 | Litz | G05D 1/0238 701/2 |
| 2006/0237237 | A1 * | 10/2006 | Kerschbaum | G01M 17/0072 177/145 |
| 2007/0295883 | A1 * | 12/2007 | Smith | G01M 9/02 248/589 |
| 2009/0217775 | A1 * | 9/2009 | Litz | G01M 17/007 73/862.391 |
| 2010/0170334 | A1 * | 7/2010 | Cogotti | G01M 9/04 73/147 |

FOREIGN PATENT DOCUMENTS

| | | |
|---|---|---|
| DE | 10 2008 036 315 A1 | 1/2010 |
| JP | S62-38333 A | 2/1987 |
| JP | 2007-503573 A | 2/2007 |
| JP | 2009-506305 A | 2/2009 |
| JP | 2010-014431 A | 1/2010 |
| JP | 2011-513747 A | 4/2011 |
| WO | WO 2005/022108 A1 | 3/2005 |

OTHER PUBLICATIONS

International Preliminary Report on Patentability issued in PCT/EP2012/071536 issued May 6, 2014.
Jul. 19, 2016 Office Action issued in Japanese Patent Application No. 2014-539322.

* cited by examiner

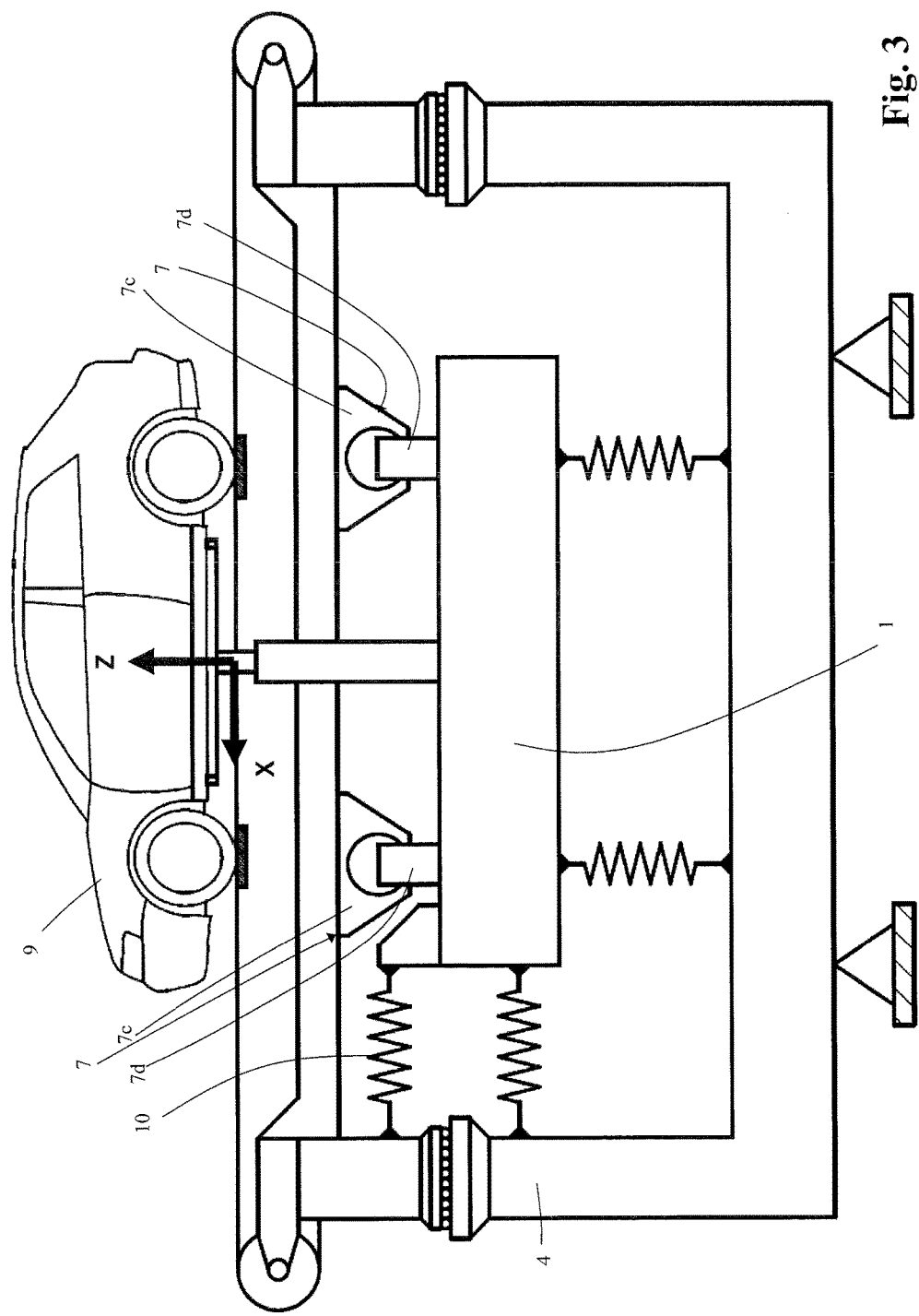

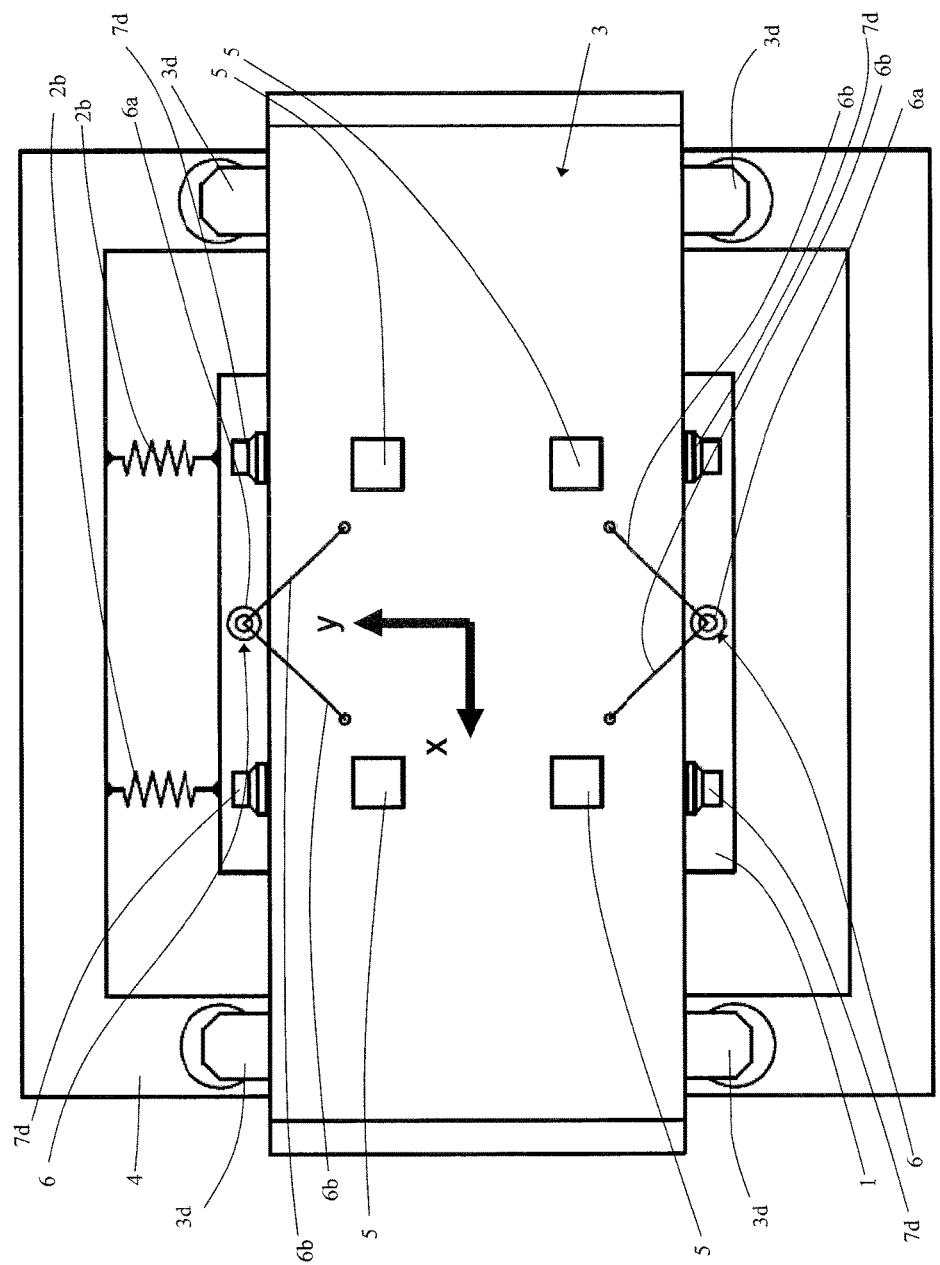

WIND TUNNEL BALANCE

BACKGROUND

The present invention relates to a wind tunnel balance that permits high-precision measurements; in particular, the wind tunnel balance according to the invention can be used to separately detect parasitic forces in the z direction that are produced, for example, due to the vehicle being incorrectly affixed to a conveyor belt. In addition, the weight forces acting on a platform are minimized, thus increasing the measurement precision. This can be achieved by supporting the platform of the wind tunnel balance so that it is able to move relative to a frame; the weight force of a belt unit and a (motor) vehicle resting on it are supported relative to the frame.

In order to measure forces that act on a motor vehicle during aerodynamic testing in a wind tunnel, various test bed or test stand setups are known, e.g. one-belt, three-belt, or five-belt systems. The coordinate system is selected so that the x axis is oriented in the travel direction of a conveyor belt of the test stand. The y axis is perpendicular to the conveyor belt. The z axis, starting from the surface of an upper run of the conveyor belt, points away from the conveyor belt (see the coordinate system in the drawings).

One-belt systems have a belt unit with a wide, continuous conveyor belt that travels around two rollers or drums. For aerodynamic tests, the motor vehicle is positioned with all four wheels on the one conveyor belt and is affixed relative to it. This is accomplished, for example, with fixing devices that are situated to the side of the conveyor belt. The wheels are supported on mounts (rocker pads), which are positioned underneath the upper run of the conveyor belt, between the rollers. As a rule, the rocker pads are connected to measuring sensors so that it is possible, for example, to detect forces in the z direction, e.g. the weight force of the motor vehicle, lift forces, and negative lift forces. The forces in the z direction are therefore measured through the conveyor belt. In this context, this is referred to as a through-the-belt measurement.

Through-the-belt measurement is also used in three-belt, five-belt, and seven-belt systems. In three-belt test stands, the tires of the motor vehicle rest on narrower side belt units. In order to simulate the road surface, a so-called middle belt travels between the conveyor belts of the side belt units. The through-the-belt measurement is carried out on the two side belt units. In a five-belt test stand setup, a middle belt unit and four smaller belt units to the side of it are provided. Usually, a motor vehicle is placed onto the four side belt units and the belt units themselves are weighed. In this case, the through-the-belt measurement is frequently not used, but is, however, possible. In five-belt systems, the through-the-belt measurement is particularly used when the track width of a motor vehicle is less than or equal to the width of the middle belt and the motor vehicle is resting on only the middle belt.

In known wind tunnel balances, the measurement of aerodynamic forces that act on a (motor) vehicle when it is being tested on the wind tunnel balance can be distorted by parasitic forces. These parasitic forces are caused among other things by slippage of the wheels of the vehicle, an imprecise fixing of the vehicle to the conveyor belt, or due to so-called walk and/or roll forces. Parasitic forces in the z direction are, for example, produced due to the fact that securing cables of a restraint system (fastening device) that holds the vehicle in position on the conveyor belt are not oriented parallel to the horizontal and therefore generate a parasitic (fictitious) force that is detected by the rocker pads. Conventional wind tunnel balances cannot separately detect these parasitic forces or can only do so with a considerable degree of additional complexity, which can result in further measurement inaccuracies.

With regard to the topic of parasitic forces, EP 1 656 541 proposes placing an entire wind tunnel test bed with a single conveyor belt on a single weighing plate that is supported so that it can be moved relative to a stationary reference system. Aerodynamic forces are detected by means of movements of the weighing plate relative to the stationary reference system. In this apparatus, the parasitic forces in the x, y, and z directions occur as internal forces so that it is not possible to display or separately detect them. Consequently, one disadvantage of the test bed according to EP 1 656 541 is that parasitic (fictitious) forces that are produced, for example, by the fixing of the vehicle cannot be easily displayed or detected separately from the aerodynamic forces in the z direction (which are produced by aerodynamic lift and negative lift as well as the vehicle weight). This can lead to distortions in the measuring results. The device according to EP 1 656 541 also does not permit ventilation losses of the vehicle wheels to be detected separately (in isolation). It is also disadvantageous that the wind tunnel balance according to EP 1 656 541 rests with its whole weight on the single weighing plate that is simultaneously also used to detect the forces. The high weight that is consequently also resting on the weighing plate can reduce the measurement precision.

SUMMARY

The object of the present invention is to provide a wind tunnel balance that has a high measurement precision.

The object is attained by the features of the independent claim. Features of preferred modifications of the present invention are described in the dependent claims.

A wind tunnel balance according to the invention can have at least one belt unit. The belt unit can have at least one belt unit frame equipped with at least one conveyor belt that can be wound around at least two rollers.

The wind tunnel balance can also have at least one fastening device that can be suitable for fastening a vehicle in a predetermined position relative to the conveyor belt.

The wind tunnel balance can also include a frame and a platform. The platform can be supported so that it is able to move relative to the frame. Force measuring elements can be provided between the platform and the frame, which can detect forces between the frame and the platform (resulting from forces acting on the vehicle and/or on the belt unit and/or on the conveyor belt).

The fastening device can be attached to the platform.

In addition, the at least one belt unit can be supported on the frame in an essentially frictionless fashion. The platform can be coupled to the at least one belt unit by means of at least one connecting mount in such a way that forces in the x and/or y direction can be transmitted from the belt unit to the platform. In addition, the connecting mount can connect the platform and the belt unit in an essentially frictionless fashion in the z direction.

The wind tunnel balance according to the invention makes it possible to achieve an increased measurement precision. The weight of the belt unit and the motor vehicle is supported on the frame and not on the platform so that less stress is placed on the platform and the force measuring elements provided on it. This increases the measurement sensitivity or measurement precision and makes it possible to achieve the measurement sensitivity or measurement precision of approximately 1 N that has in the meantime become a necessity. In addition, the measurement precision is increased by the fact that parasitic forces in the z direction can be separately detected by means of z force measuring elements that are provided between the platform and the frame.

The term "belt unit frame" can, for example, include all of the components that make up the basic frame on which for example the rollers of the belt unit and the conveyor belt can be arranged. The belt unit frame can be composed of one piece or of multiple pieces.

Typically, a belt unit essentially includes a belt unit frame, a conveyor belt, and two rollers. It can also include other belt unit components such as a drive unit for driving the conveyor belt, hydraulic systems, electrical components, etc. that are not discussed here.

The fastening device (restraint system) can, for example, be composed of two fastening brackets or rods (first fastening elements) that can each be arranged laterally relative to the conveyor belt and can also include securing elements (second fastening elements) such as cables, straps, belts, rods, and/or combinations thereof, which can be arranged on the fastening brackets and can also be arranged, for example by means of rocker fittings, in corresponding sockets in the motor vehicle frame.

Securing the vehicle to the conveyor belt means that the vehicle maintains its predetermined position on the conveyor belt during the aerodynamic tests or other tests, i.e. does not deviate from this position.

The fixed arrangement of the fastening device on the platform can be implemented, for example, by means of nonpositive, frictional engagement or by means of positive, form-fitting engagement.

Essentially, the term "frictionless" is intended to mean that the mount is as free as technically possible of friction report forces in the indicated direction. The connecting mount transmits (essentially) no forces, for example, in the z direction since the mount is essentially frictionless in the z direction.

The connecting mount couples or connects the belt unit and the platform. In this case, the connecting mount can preferably be provided on the belt unit frame.

In addition, the belt unit can be supported on the frame in an essentially frictionless fashion by means of a floating mount.

A "floating mount" means for example that the mount absorbs forces in the z direction and does not absorb x and/or y forces, i.e. the belt unit is supported in sliding fashion. This decoupling of the forces according to the invention, i.e. z forces are absorbed directly by the frame and x and/or y forces are conveyed into the platform via the connecting mount, increases the measurement precision of the wind tunnel balance.

The floating mount of the wind tunnel balance can permit a relative movement of the belt unit in the x and y direction relative to the frame.

In addition, the at least one connecting mount of the wind tunnel balance can be a hydrostatic and/or pneumatic mount. In this case, at least one guide pin can be arranged in an essentially frictionless fashion in at least one guide socket.

Hydrostatic mounts include, for example, all mounts that permit an essentially frictionless support by means of oil- or water pressure. Pneumatic mounts include, for example, air pressure mounts.

The guide pin/piston/rod/mechanism slides in frictionless fashion in the guide socket and is positioned in the z direction, for example in a hydraulic or pneumatic fashion. The guide socket can be embodied as a function of the shape of the guide pin and as a function of the required force transmission direction. With an essentially cylindrical guide pin and a desired force transmission between the belt unit and the platform in the x and y direction, the guide socket can preferably be an essentially cylindrical bore or opening.

In addition, the at least one connecting mount can permit a transmission of forces in the x direction from the belt unit to the platform and can connect the platform to the frame in an essentially frictionless fashion in the y and z directions. This permits measurements in which essentially x forces are of interest.

The wind tunnel balance can also have at least one x force measuring element, at least one y force measuring element, and/or one z force measuring element—each provided between the platform and the frame.

The at least one x force measuring element can be arranged so that it is possible to detect a force in the x direction between the platform and the frame.

The at least one y force measuring element can be arranged so that it is possible to detect a force in the y direction between the platform and the frame.

The at least one z force measuring element can be arranged so that it is possible to detect a force in the z direction between the platform and the frame.

The force measuring elements can, for example, detect a small relative movement between the platform and the frame as a path change and can output it as a force value.

This consequently enables each measuring device to detect forces separately. The force values can, for example, be supplied to an evaluation unit—i.e. a computer.

The force measuring elements (or force detecting elements) can, for example, be load cells that function based on strain gauges, in a piezoelectric fashion, or in a piezoresistive fashion in order to convert a path change, expansion, compression, tension, and/or pressure into an electrical force signal.

The force measuring elements can each be arranged between two respective Eulerian columns so that only forces that are normal to the direction of the Eulerian columns are transmitted to the force measuring elements. The Eulerian columns can, for example, have shapes/curvatures that are positioned so that they are skew relative to each other by 90°, for example, in order to essentially only transmit to the load cell forces that are oriented in the normal direction relative to the column axis.

The wind tunnel balance can also have at least one ventilation loss force measuring element. The ventilation loss force measuring element can be arranged between the belt unit and the platform so that it is possible to detect a force in the x direction between the platform and the belt unit, thus making it is possible to separately detect a ventilation loss of the vehicle wheels.

Detecting a small relative movement between the belt unit and the platform makes it possible to isolate, separately evaluate, and detect the ventilation losses, thus further increasing the measurement precision of the wind tunnel balance as a whole.

The ventilation loss force measuring element is preferably provided on the platform in addition to the x, y, and z force measuring elements.

In addition, the wind tunnel balance can have at least one rocker pad that is situated underneath an upper run of the at least one conveyor belt. The rocker pad can be arranged so that the vehicle, when it is affixed to the conveyor belt, rests on the conveyor belt with the vehicle wheels on top of the at least one rocker pad. In addition, the at least one rocker pad can detect forces in the z direction, in particular the weight force of the vehicle as well as lift forces and/or negative lift forces.

The rocker pads detect the forces of the wheel contact area and after these forces are added up, the sum of the z forces, i.e. the weight force of the vehicle, lift forces, and negative lift forces as well as parasitic forces in the z direction. In addition, detecting a deflection of the rocker pad away from the zero position makes it possible to detect additional moments around the x and/or y axis.

The term "rocker pad" here means any measuring device that can be used to measure z forces, particularly for through-the-belt measurements. Preferably, each vehicle wheel is provided with a respective rocker pad, i.e. as a rule, four rocker pads are provided.

In addition, the fastening device can secure the vehicle to the conveyor belt in a fixed position above the at least one rocker pad. The fastening device can also fix the vehicle so that forces in the x, y, and/or z directions can be transmitted from the vehicle to the platform via the fastening device.

This makes it possible parasitic forces in the x and y directions that occur in the form of internal forces that are not detected by the force measuring elements, i.e. these parasitic forces do not result in a distortion of measurement values.

The wind tunnel balance can also use the at least one z force measuring element to separately detect parasitic z forces that are transmitted to the z force measuring element via the fastening device and the platform.

This makes it possible to separately detect parasitic z forces that are contained in the measurement values of the rocker pads, namely by means of the z force measuring elements. The z force measuring elements indicate only the parasitic z forces so that these can be offset with the force value detected in the rocker pad. The offset force values therefore provide a more precise representation of the real measuring situation.

In addition, the wind tunnel balance can have one, three, or five belt units. This is advantageous with regard to a possible flexible use of the concept according to the invention in multiple belt systems, e.g. three-belt, or five-belt systems. It is even a possibility for there to be convertibility between the individual systems.

In summary, the wind tunnel balance according to the invention has the special advantage of achieving an increased measurement precision since parasitic z forces can be separately detected and the considerable weight force of the wind tunnel balance can be diverted to separate mounts, i.e. so that it is not transmitted via the platform.

BRIEF DESCRIPTION OF THE DRAWINGS

The invention will be described by way of example below with reference to the accompanying schematic drawings. In the drawings:

FIG. 3 shows a sketch of a side view of the wind tunnel balance according to the invention, according to example 2, and FIG. 4 shows a sketch of a top view of the wind tunnel balance according to the invention, according to example 2.

DETAILED DESCRIPTION OF EMBODIMENTS

Figure 1:
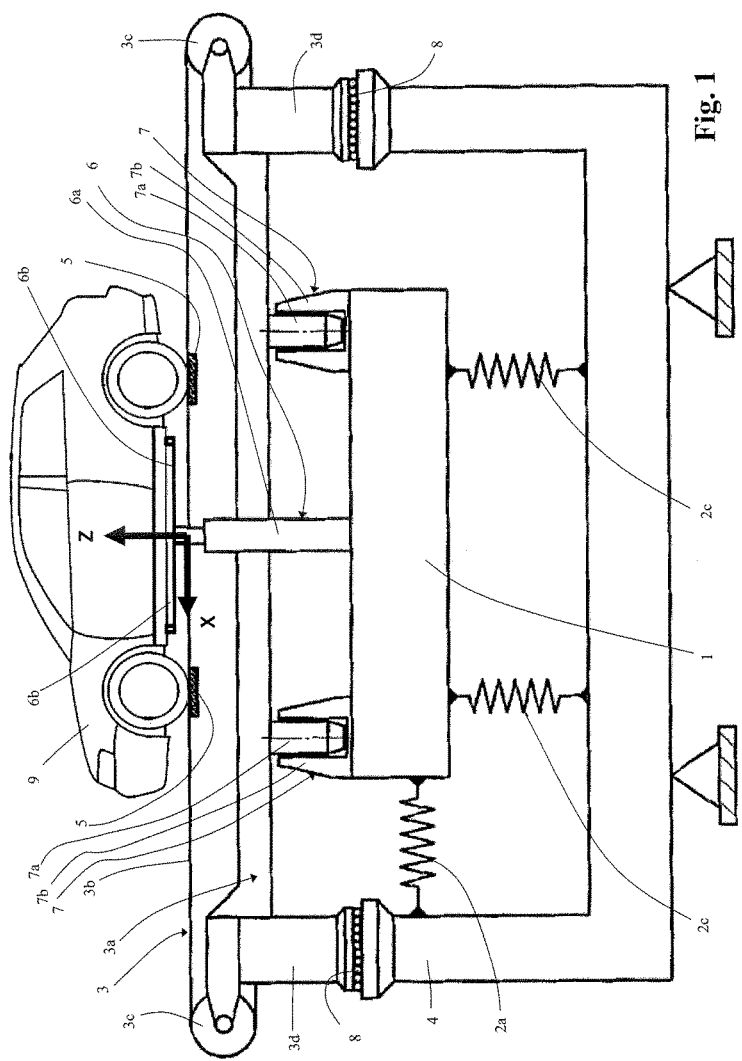
FIG. 1 shows a sketch of a side view of the wind tunnel balance according to the invention, according to example 1.

FIG. 1 shows a preferred example of the wind tunnel balance according to the invention. A platform (1) is used, which is connected or coupled to the belt unit (3) and/or a belt unit frame (3a) by means of a connecting mount (7) with frictional, nonpositive engagement only with regard to the x and y directions. The forces in the z direction are diverted via (essentially) frictionless mounts (8), e.g. floating mounts or sliding mounts. The frictionless mounts (8) can also be embodied as articulated mounts, i.e. the mounts are then composed of rod-shaped or column-shaped supports that have cross-sectionally tapered sections (curves, recesses) that are that are oriented so that they are skew relative to each other by for example 90° in the axial direction. It is also possible to provide each support with more than two cross-sectionally tapered sections.

FIG. 1 shows that a belt unit frame (3a) of the belt unit (3) has two rollers (3c) supported in rotary fashion. A continuous conveyor belt (3b) is arranged (wound) around these rollers (3c) and can be set into motion, for example, by a rotating motion of the rollers (3c). The belt unit frame (3a) has stand elements (3d) that support the weight of the belt unit (3) and are each supported on a frame (4) by means of a respective floating mount (8). Consequently, the weight force of the belt unit (3) and of the motor vehicle (9) possibly resting on it is diverted into the frame (4). In addition, the frame (4) can be supported so that it is able to rotate around the z axis relative to its surroundings (not shown).

The platform (1) is for example a unit that is arranged centrally in the frame (4). The distances shown in FIG. 1 between the platform (1) and the frame (4) are provided for better illustration, i.e. much smaller or larger distances can be provided. The shape of the platform (1) can be embodied in plate-like fashion, in the basic shape of a rectangle, as shown in FIG. 1. A more complex form of the platform (1), however, is also possible according to the invention. The platform (1) does not necessarily have to be embodied as plate-shaped.

It is also clear from FIG. 1 that two connecting mounts (7) make it possible to couple the x and y movement between the belt unit (3) and/or its belt unit frame (3a) and the platform (1). FIG. 1 shows that the connecting mounts (7) have guide pistons (7a) mounted on the side oriented toward the belt unit, which engage in associated guide sockets (7b) that are mounted on the platform (1). The guide pistons (7a) slide in (essentially) frictionless fashion inside the guide sockets in the z direction, i.e. up and down. A support in the z direction is embodied, for example, in a hydraulic or pneumatic fashion so that no forces or essentially no forces are transmitted from the belt unit (3) to the platform (1) in the z direction. By contrast, the positive, form-fitting engagement of the guide piston (7a) in the preferably complementarily shaped—in this case cylindrical—guide socket (7b) permits x and y movements of the belt unit (3) and/or its belt unit frame (3a) to be transmitted/transferred to the platform (1).

By means of z force measuring elements (2c)—only two are shown, but it is particularly preferable to provide three or four—the platform (1) is supported in the frame (4) in the direction of the vertical axis (z direction). Forces detected can, for example, be displayed by means of an evaluation unit (not shown).

The forces along the driving axis (x forces) are detected with at least one x force measuring device (2a), which in FIG. 1 is provided between a front end of the platform (1) in the x direction and a section of the frame (4).

The forces perpendicular to the driving axis (y forces) are detected/measured with at least one, preferably two, y force measuring element(s) (2b). Two y force measuring elements can be provided that are arranged on the side of the platform (1) and are spaced apart from each other in the x direction. The opposite end of the y force measuring element (2b) is solidly attached to the frame (4).

In the figures, all of the force measuring elements (2) are schematically depicted in the form of spring elements. In the real device, preferably load cells or strain gauges (or strain gauges integrated into load cells) are used (it is also possible, however, to use other force measuring devices), which are arranged centrally in one or between two Eulerian columns or pillars. It is naturally also possible to provide an alternative fastening and/or arrangement of the force measuring elements.

FIG. 1 also shows that the platform (1) is connected to at least two (or possibly also three or more) first fastening elements (6a) (fastening brackets) of a fastening device (6) (restraint system). The two fastening brackets (6a) stand in the z direction, preferably vertically and respectively to the side of the conveyor belt (3b), preferably in a central position—with regard to the x direction—of the wind tunnel balance on the platform (1). FIG. 1 also shows that the upper ends—in the z direction—of the fastening brackets (6a) protrude beyond the z height of the upper run of the conveyor belt (3b). Preferably, at least one second fastening element (6b) is fastened in the protruding end section of the fastening brackets (6a). The second fastening element (6b) is preferably a cable, a belt, a very thin rod, or an arrangement of various components such as cables, belts, etc. and, at the end oriented toward the vehicle (9), can have a rocker fitting. Preferably, at least two second fastening elements (6b) are provided for each side of the vehicle (in the y direction), which are arranged in corresponding sockets on the vehicle (9) by means of rocker fittings. The second fastening elements (6b) hold the vehicle (9) in a predetermined position on (relative to) the conveyor belt (3b). Any x/y forces acting on the cables are diverted via the cables (6b) and only act as internal forces, i.e. these forces are not detected by the force measuring elements (2a, 2b).

If the second fastening elements (6b) are not guided exactly in the horizontal direction, for example, this produces parasitic z forces that are detected by at least one rocker pad (5) underneath the upper run of the conveyor belt (3b). In addition, these parasitic z forces are also separately conveyed to the z force measuring element (2c) via the fastening device (6). This permits an offsetting/correction of the measured z forces at the rocker pad (5) and at the z force measuring elements (2c) and thus enables an increased measurement precision.

Figure 2:
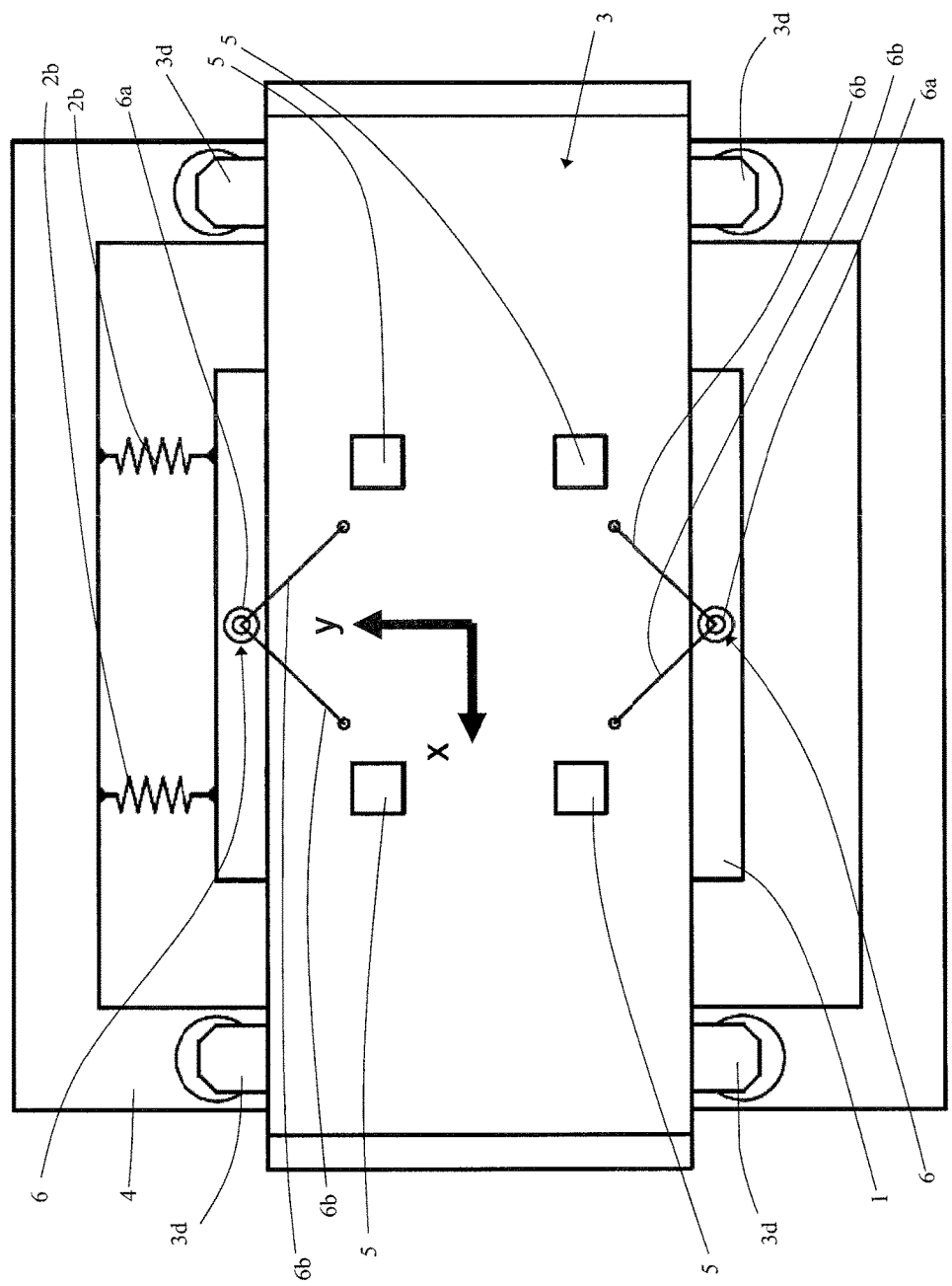
FIG. 2 shows a sketch of a top view of the wind tunnel balance according to the invention, according to example 1.

FIG. 2 schematically depicts a top view of the example according to FIG. 1. It is clear from the depiction in FIG. 2 that a one-sided arrangement of y force measuring elements (2b) is sufficient to allow a precise measurement to be carried out. It also shows that the platform (1) protrudes laterally (in the y direction) at least far enough beyond the outer lateral edge of the conveyor belt (3b) that there is room for the fastening brackets (6a) in the protruding sections.

FIG. 2 also shows the arrangement of the platform (1) that is situated in the middle of the frame (4) or is at least essentially centered in it.

Underneath the conveyor belt (3b), shown by means of squares in FIG. 2, rocker pads (5) are provided on which the vehicle wheels are positioned. The vehicle (9) is not shown in FIG. 2. The rocker pads (5) use a through-the-belt measurement to detect a weight force, i.e. a z force here, that can have various components. For example, the z force detected by means of the rocker pads (5) can in particular be the sum of the weight force of the vehicle (9), lift forces, negative lift forces, and parasitic z forces. As has already been described several times, the wind tunnel balance according to the invention can detect the parasitic z forces separately so that they can be offset (corrected) with the z forces measured at the rocker pads (5).

FIG. 2 also shows the second fastening elements (6b) whose ends respectively connect a socket on the vehicle frame and the associated first fastening element (6a) to each other.

In another example of the wind tunnel balance according to the invention (FIGS. 3 and 4), the at least one belt unit (3) or the belt unit frame (3a) or the conveyor belt(s) (3b) is/are connected to the platform (1) via an additional force measuring element (10). This makes it possible to separate forces occurring in the wheels, e.g. roll forces, walk forces, and/or ventilation losses that are measured at the ventilation loss force measuring element (10). The other aerodynamic forces continue to be available at the force measuring elements (2a-2c). Specifically, FIG. 3 shows that the ventilation loss force measuring element (10) is solidly mounted to a front end of the platform (1) in the x direction (but a different position is also possible). By contrast with the other force measuring elements (2a-2c), the second end of the ventilation loss force measuring element (10) is situated on the belt unit (6). In this case, it is situated on one of the stand elements (3d). It is thus possible, for example, to detect the relative movement in the x direction between the platform (1) and the belt unit (3), thus permitting an additional, separate determination of the ventilation losses in the wheels of the vehicle (9). These ventilation losses can, for example, be offset with the other detected force values in order to increase the measurement precision of the wind tunnel balance.

In addition, FIG. 3 together with FIG. 4 also shows another example of the connecting mount (7) according to the invention. It should be noted here that the additional example of the connecting mount (7) is only shown together with the example of the additional ventilation loss force measuring element (10) for illustration purposes. Naturally, the example according to FIG. 1 can also have the additional ventilation loss force measuring element (10).

As is particularly shown in FIG. 3, two rails (7c) are solidly mounted onto the belt unit and are spaced apart from each other in the x direction. Two engaging elements (7d) solidly mounted to the platform (1) on each side engage in the receiving opening of the rails (7c) so that—as in the example according to FIG. 1—a coupling of the x/y movements is possible, but a frictionless support is provided in the z direction.

Naturally, examples or embodiments of the wind tunnel balance are also possible in which, for example, a movement coupling only in the x direction or only in the y direction is implemented and a frictionless support is provided in the z direction and in the x or y direction.

In summary, the wind tunnel balance according to the invention has the advantage that parasitic forces in the z direction can be conveyed via the fastening device (6) to the z force measuring element (2c) and measured by the latter in an isolated fashion. As a result, the measuring values of the rocker pads (5) can be corrected and more precise measurements can be carried out. The measurement precision is further increased by the fact that the weight force of the wind tunnel balance is diverted via the floating mounts (8) and therefore does not exert strain on the platform (1).

The examples shown can be arbitrarily combined with one another in any way that would be obvious to the person skilled in the art.

1 platform
2 force measuring element
2a x force measuring element
2b y force measuring element
2c z force measuring element
3 belt unit
3a belt unit frame
3b conveyor belt
3c roller
3d stand elements
4 frame (of the wind tunnel balance)
5 rocker pad
6 fastening device
6a first fastening element (side brackets)
6b second fastening element (belts, cables, etc.)
7 connecting mount
7a guide pin/driving pin
7b guide socket
7c rail
7d engagement element
8 floating/sliding mount
9 (motor) vehicle
10 ventilation loss force measuring element

The invention claimed is:

1. A wind tunnel balance, comprising:
at least one belt unit that has at least one belt unit frame equipped with at least one conveyor belt that is wound around at least two rollers;
at least one fastening device configured to fasten a vehicle to the conveyor belt in a predetermined position;
a frame; and
a platform that is supported so that it is configured to move relative to the frame, wherein
force measuring elements are provided between the frame and the platform and are configured to detect forces between the frame and platform,
the fastening device is attached to the platform,
the at least one belt unit is supported on the frame,
the platform is coupled to the at least one belt unit by means of at least one connecting mount such that forces in the x and/or y direction are transmitted from the belt unit to the platform,
the connecting mount connects the platform to the belt unit in the z direction, and
the belt unit is supported on the frame by means of a floating mount.

2. The wind tunnel balance according to claim 1, wherein the floating mount permits a relative movement of the belt unit in relation to the frame in the x and y direction.

3. The wind tunnel balance according to claim 1, wherein at least one connecting mount is a hydrostatic and/or pneumatic mount, and at least one guide pin is arranged in at least one guide socket.

4. The wind tunnel balance according to claim 1, wherein at least one connecting mount permits a transmission of forces in the x direction from the belt unit to the platform and the connecting mount connects the platform to the belt unit frame in the y and z directions.

5. The wind tunnel balance according to claim 1, wherein the force measuring elements include at least one x force measuring element, at least one y force measuring element, and/or one z force measuring element is/are provided between the platform and the frame,
the at least one x force measuring element is arranged so that it is possible to detect a force in the x direction between the platform and the frame,
the at least one y force measuring element is arranged so that it is possible to detect a force in the y direction between the platform and the frame, and
the at least one z force measuring element is arranged so that it is possible to detect a force in the z direction between the platform and the frame.

6. The wind tunnel balance according to claim 1, wherein the force measuring elements include at least one ventilation loss force measuring element is provided, which is arranged between the belt unit and the platform so that it is possible to detect a force in the x direction between the platform and the belt unit, thus making it is possible to separately detect a ventilation loss of the vehicle wheels.

7. The wind tunnel balance according to claim 1, wherein at least one rocker pad is situated underneath an upper run of the at least one conveyor belt,
the rocker pad is arranged so that the vehicle, when it is affixed to the conveyor belt, rests on the conveyor belt with the vehicle wheels on top of the at least one rocker pad, and
the at least one rocker pad detects forces in the z direction, in particular the weight force of the vehicle as well as lift forces and/or negative lift forces.

8. The wind tunnel balance according to claim 1, wherein the fastening device secures the vehicle to the conveyor belt in a fixed position above the at least one rocker pad, and
the fastening device affixes to the vehicle so that forces in the x, y, and/or z directions are transmitted from the vehicle to the platform via the fastening device.

9. The wind tunnel balance according to claim 1, wherein at least one z force measuring element is configured to separately measure parasitic forces in the z direction (z forces) that are transmitted to the z force measuring element via the fastening device and the platform.

10. The wind tunnel balance according to claim 1, which includes one, three, five, or seven belt units.

* * * * *